Figure 1:
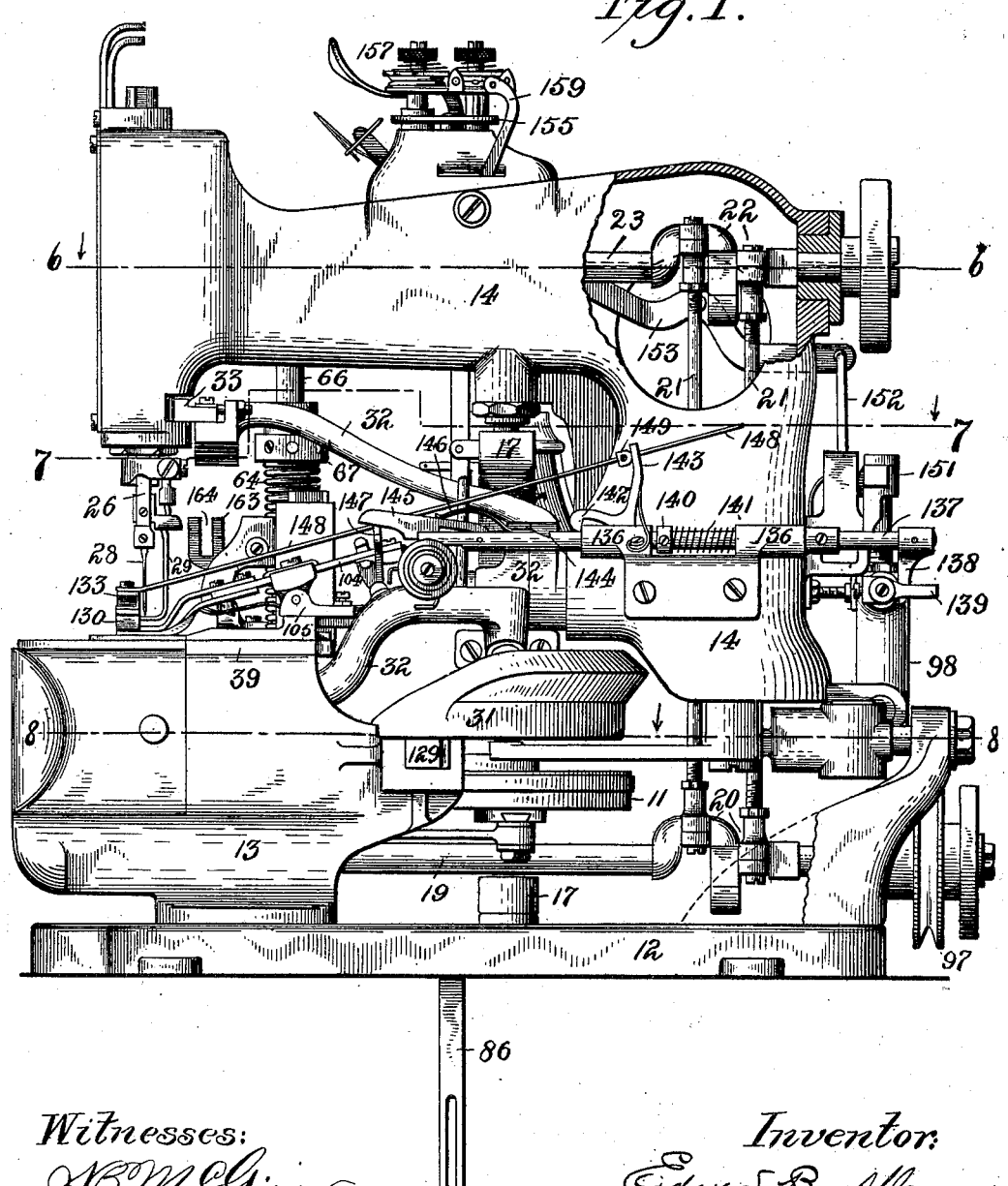

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 1.

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 2.

Fig. 2.

Witnesses:
J. B. McGirr.
Arthur W. Calvert.

Inventor:
Edward B. Allen
by Henry Calver
Atty.

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 3.

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 4.

Witnesses:
Inventor:
Edward B. Allen,

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 5.

Witnesses: Inventor:
Edward B. Allen,
by Henry Calvert
Atty.

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 6.

Witnesses:
Inventor:
Edward B. Allen

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 7.
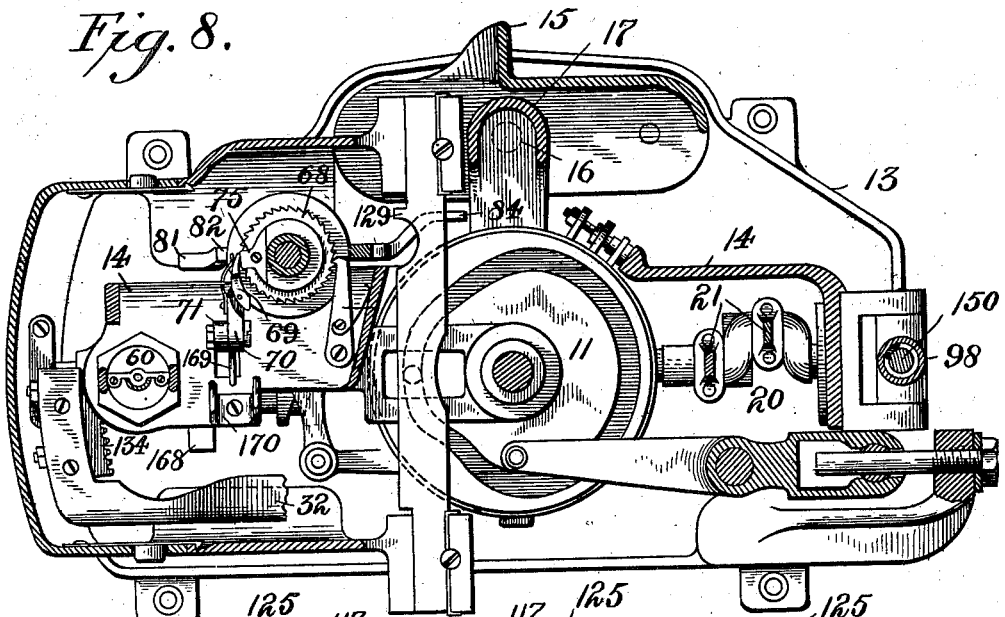

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 8.

Witnesses:
Inventor:
Edward B. Allen

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 9.
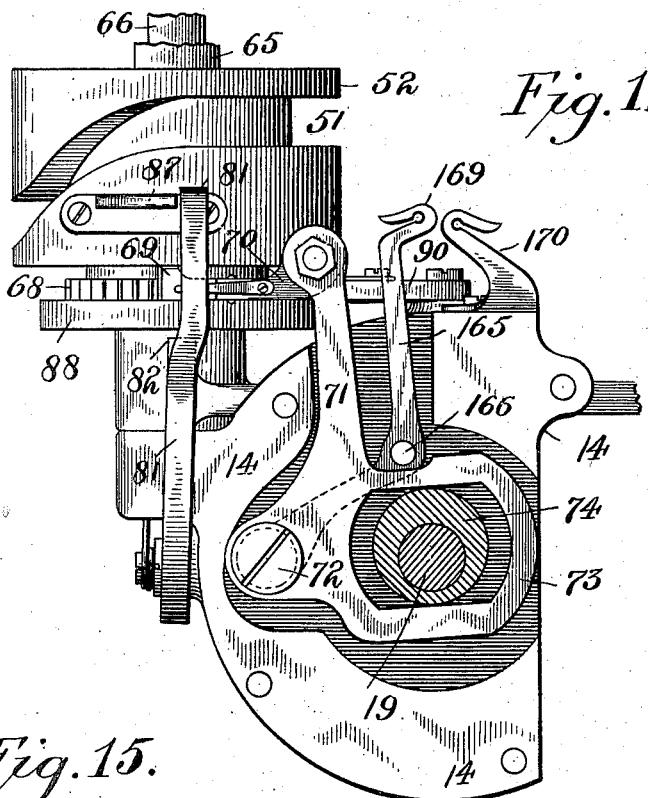
*Fig. 17.*
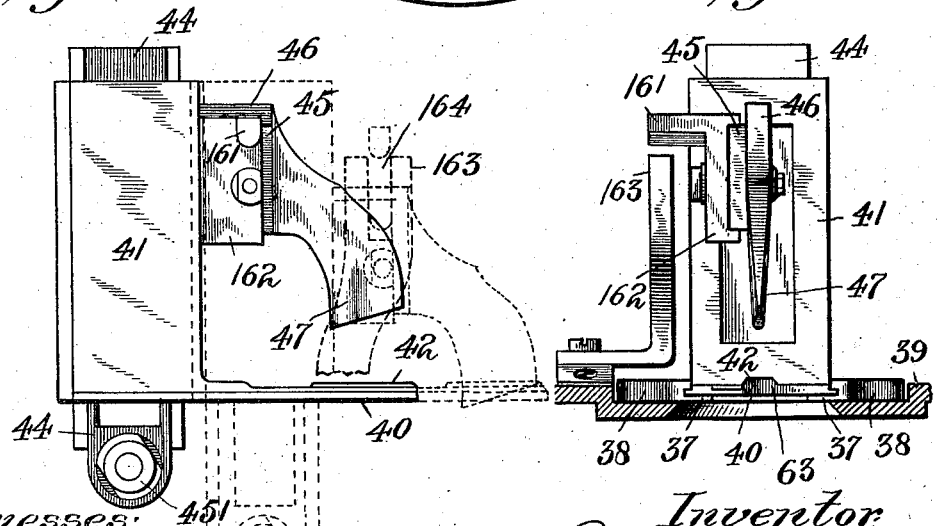
*Fig. 15.* *Fig. 16.*
Witnesses:
Inventor:
Edward B. Allen

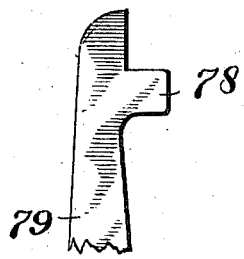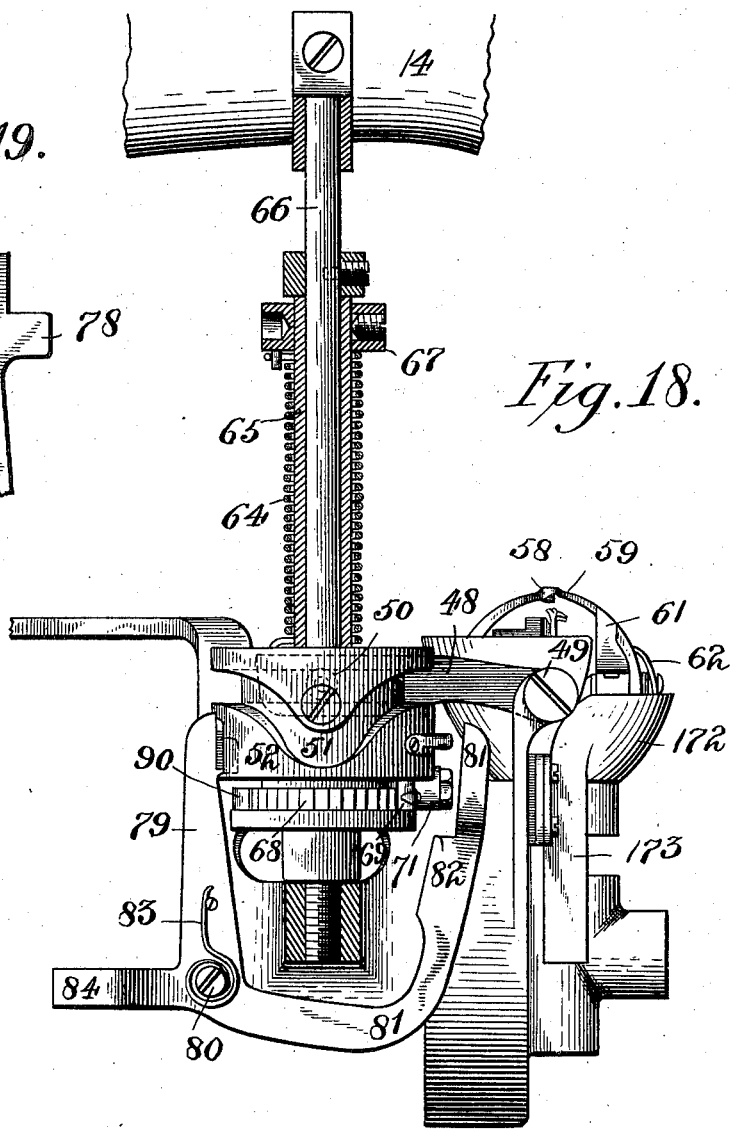

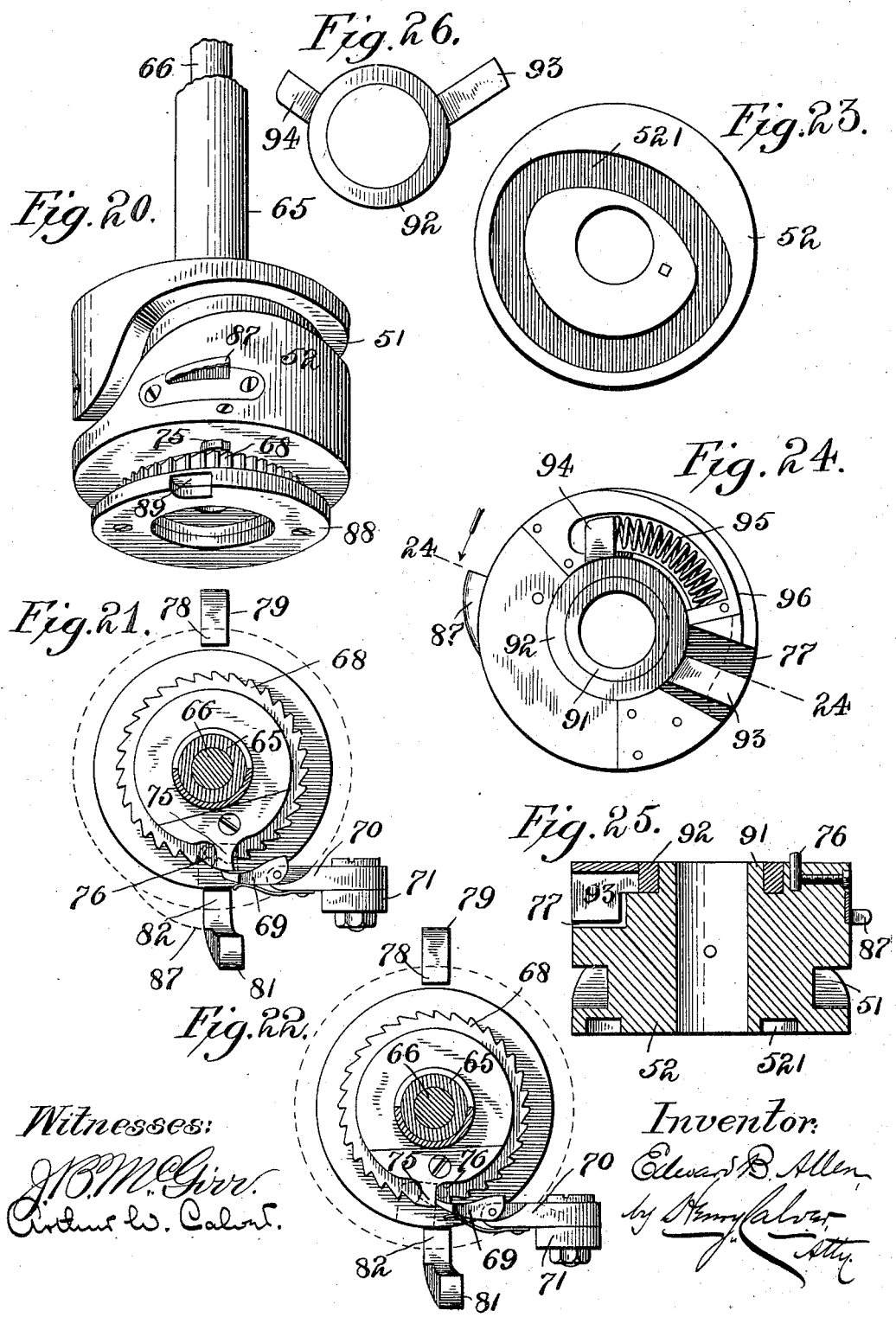

No. 736,471. PATENTED AUG. 18, 1903.
E. B. ALLEN.
BUTTONHOLE CUTTING AND STITCHING MACHINE.
APPLICATION FILED JUNE 30, 1902.
NO MODEL. 12 SHEETS—SHEET 12.
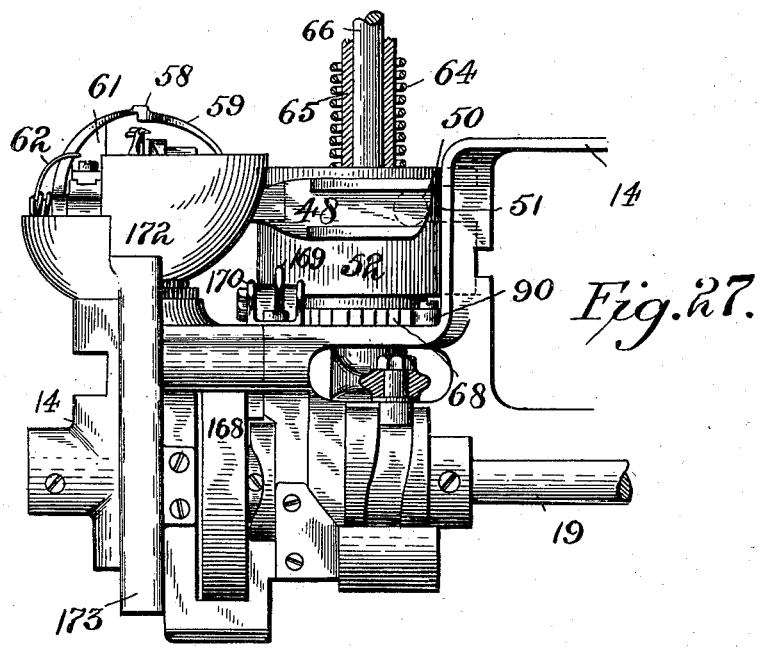
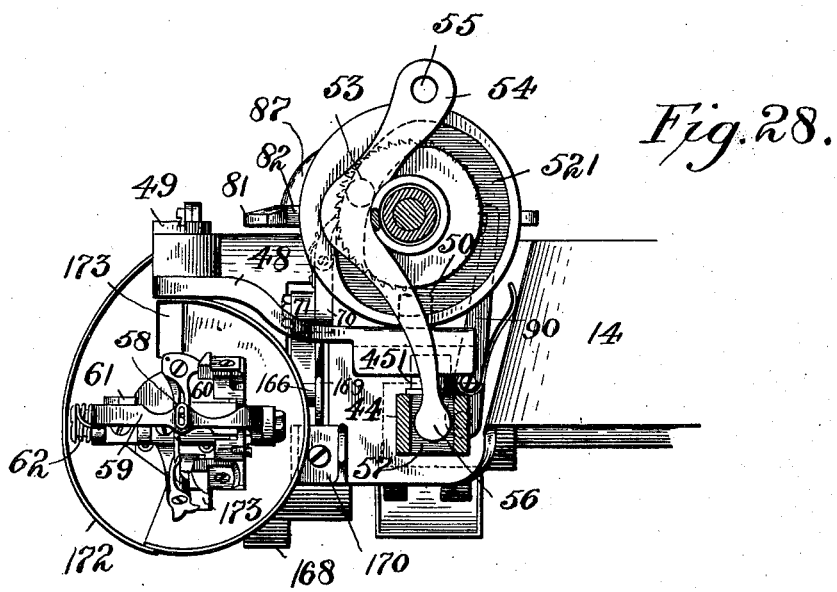
Witnesses:
Inventor:
Edward B. Allen No. 736,471. Patented August 18, 1903.

UNITED STATES PATENT OFFICE.

EDWARD B. ALLEN, OF ELIZABETH, NEW JERSEY, ASSIGNOR TO THE SINGER MANUFACTURING COMPANY, A CORPORATION OF NEW JERSEY.

BUTTONHOLE CUTTING AND STITCHING MACHINE.

SPECIFICATION forming part of Letters Patent No. 736,471, dated August 18, 1903.

Application filed June 30, 1902. Serial No. 113,808. (No model.)

*To all whom it may concern:*

Be it known that I, EDWARD B. ALLEN, a citizen of the United States, residing at Elizabeth, in the county of Union and State of New Jersey, have invented certain new and useful Improvements in Buttonhole Cutting and Stitching Machines, of which the following is a specification, reference being had therein to the accompanying drawings.

This invention relates to an automatic buttonhole cutting and stitching machine of the same general character as the machine fully shown and described in my United States application, Serial No. 24,679, filed July 24, 1900, and while the present machine is in many respects the same in principle as the machine of my said application it differs in details from the said former machine and contains many improvements not therein embodied.

The present machine comprises a fixed bed or frame, which may be termed the "work-frame," and on which the stationary work-clamp is mounted and a traveling stitching-frame carrying the stitching and feeding devices and their operating mechanisms, the said stitching-frame having a double pivotal connection with the said work-frame, so as to be free to swing horizontally in any direction to carry the stitching devices about the buttonholes, and in these respects the present machine is like the machine of my said application, as also in regard to the feature of stitching devices which have periodical rotary movements imparted to them for the purpose of stitching the eyes of the buttonholes. In the present machine the buttonhole-cutter cuts the buttonholes in stitching position, and to do this the buttonhole-cutting devices, which slide in ways on the stationary work-frame, are automatically transferred to and from cutting position or toward and away from the stitching devices, the cutter of the present machine being operated to cut the buttonholes from a cam actuated by a compressed spring wound up from the stitching driving-shaft during the stitching of a previous buttonhole, as in the machine of my said application.

The general operation of the present improved machine is as follows: The attendant places the work in position in the opened clamp and then depresses a treadle-operated rod, the downward movement of which first closes the clamp and further downward movement of which then trips a holding latch or catch to release spring-actuated cams which, through suitable connections, transfer the cutting devices to cutting position, actuate the cutter to cut a buttonhole, and then return the cutting devices to their first or out-of-the-way positions, and in effecting the back or return movements of the cutting devices a part movable with the cutter-transfer lever engages a connection to the start and stop motion device to set the stitching and feeding mechanisms into operation to stitch a buttonhole, and when this has been done the machine is stopped by suitable connections from the feeding mechanism, as in the machine of my aforesaid application.

The present machine is preferably provided with a thread-cutter mounted on an upper jaw of the work-clamp in such a manner as to sever the needle-threads close to the upper side of the work, and an arm of the movable jaw of the thread-cutter is preferably connected to a latch, which when released at a thread-cutting movement permits a spring-actuated sliding rod to move forward and automatically open the work-clamp.

Figure 3:
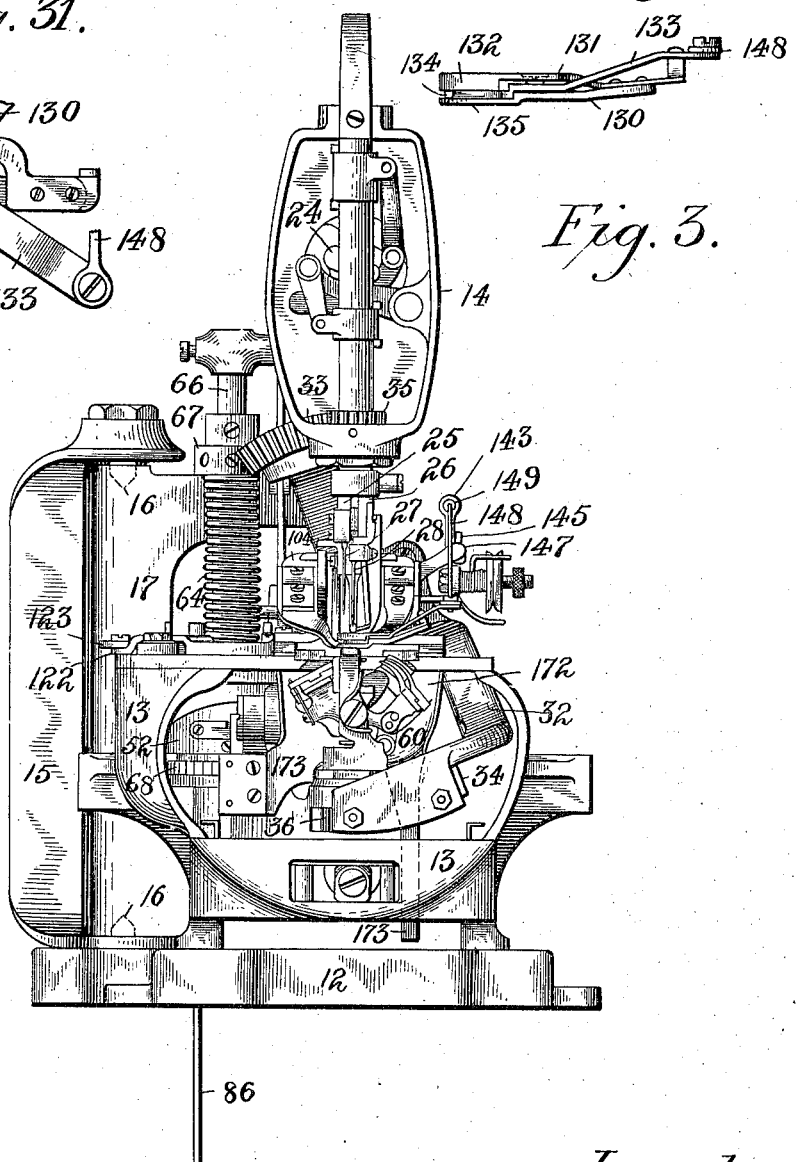
Figure 4:
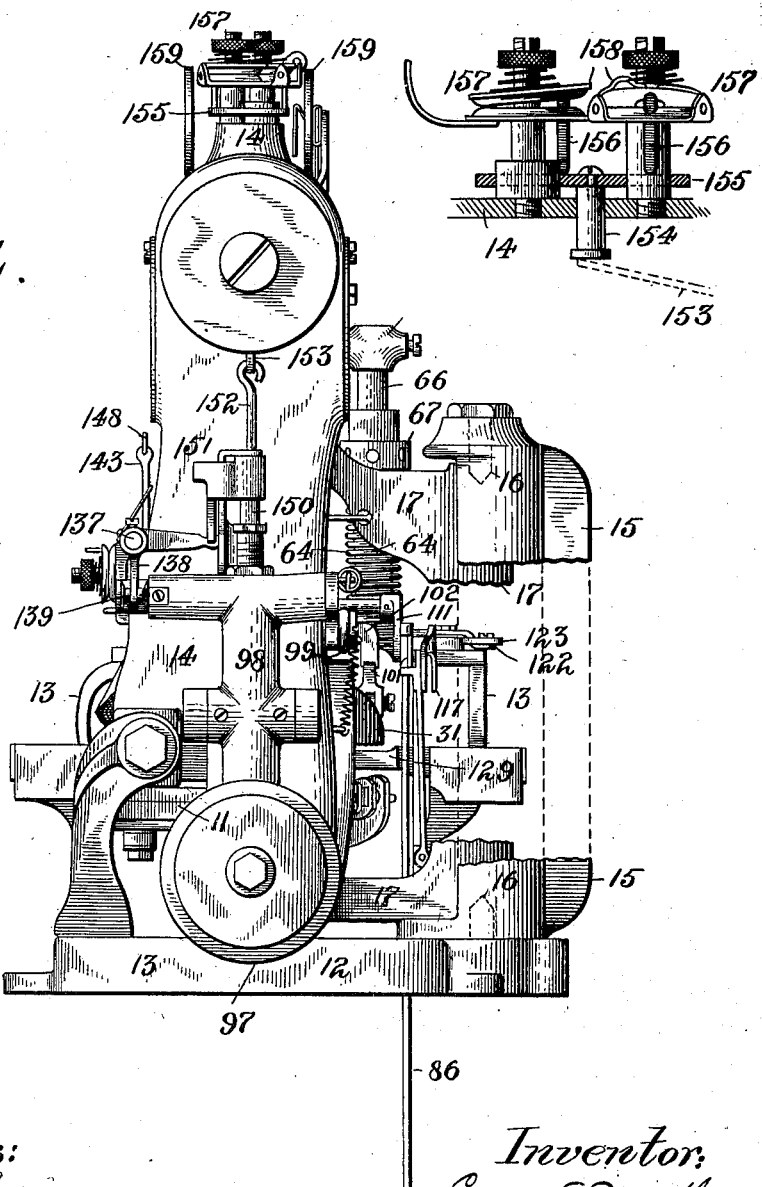
Figure 5:
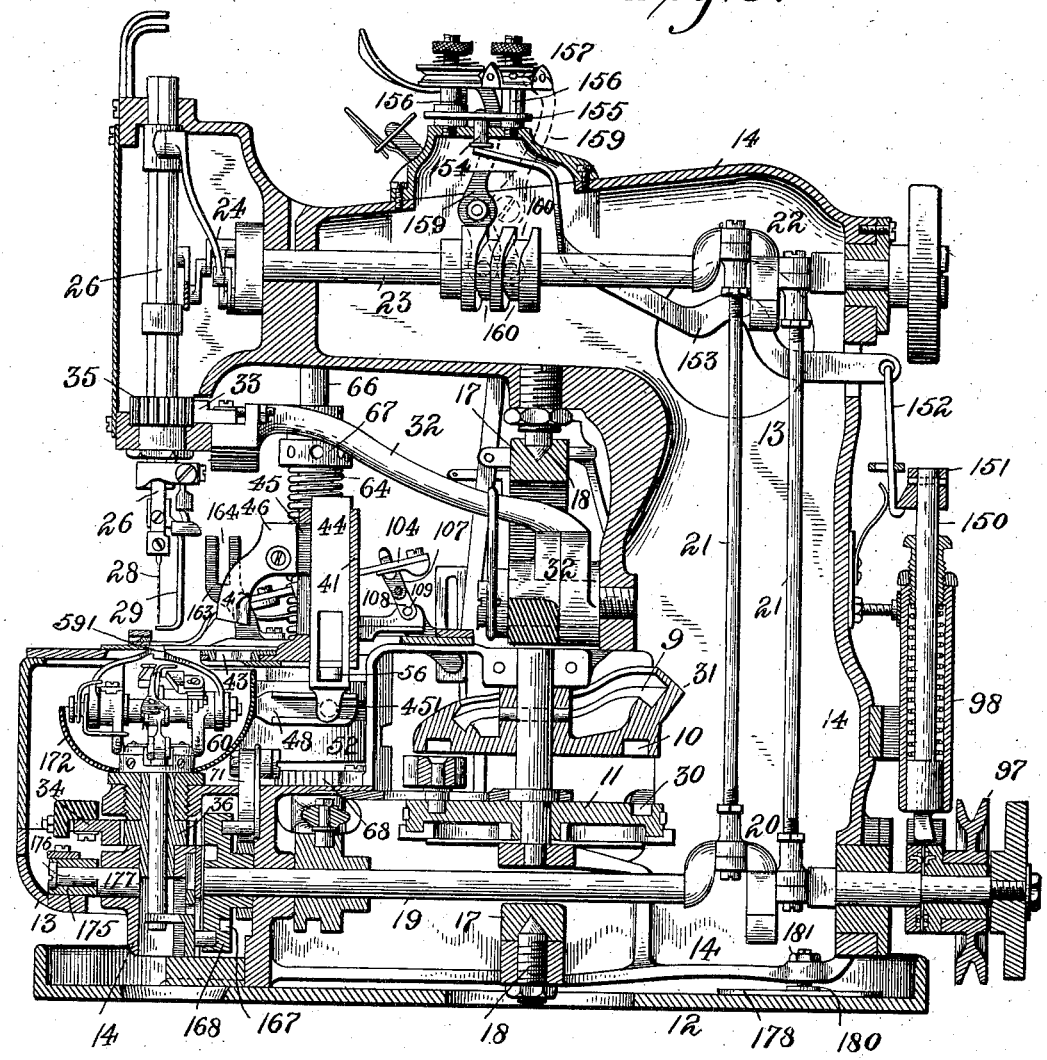
Figure 32:
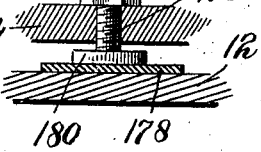
Figure 6:
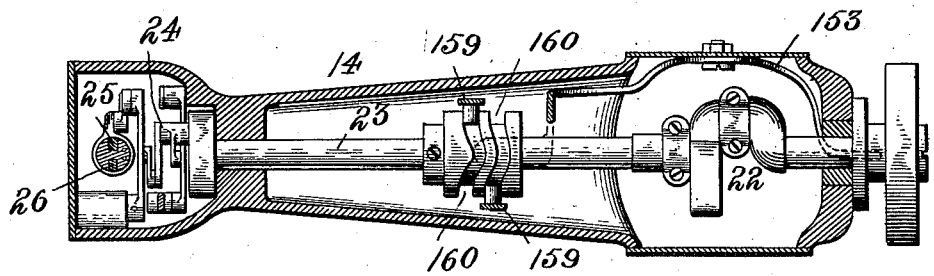
Figure 7:
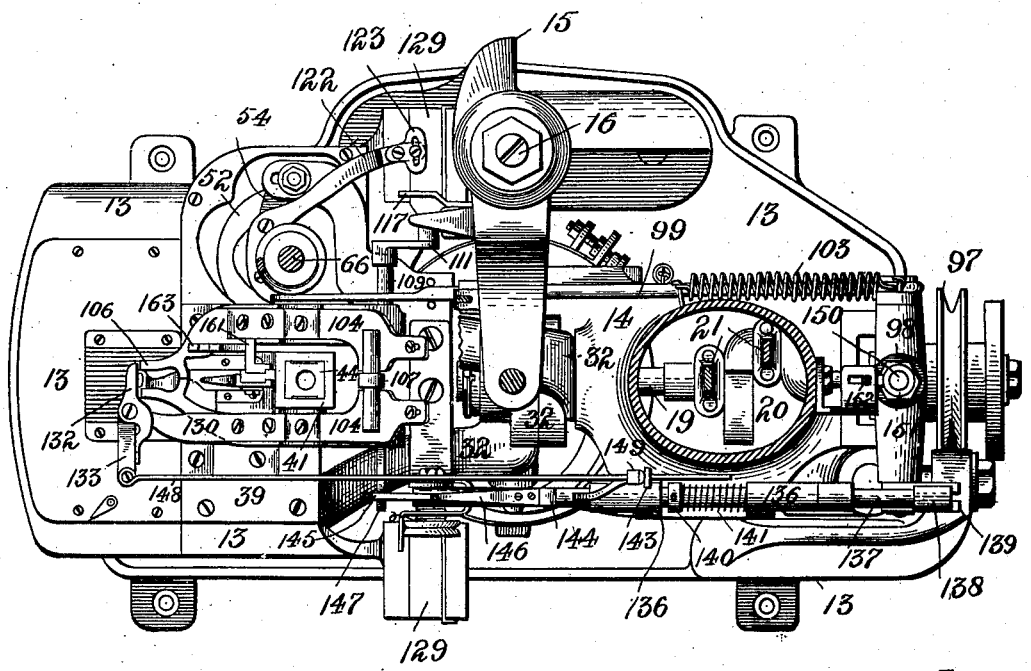
Figure 13:
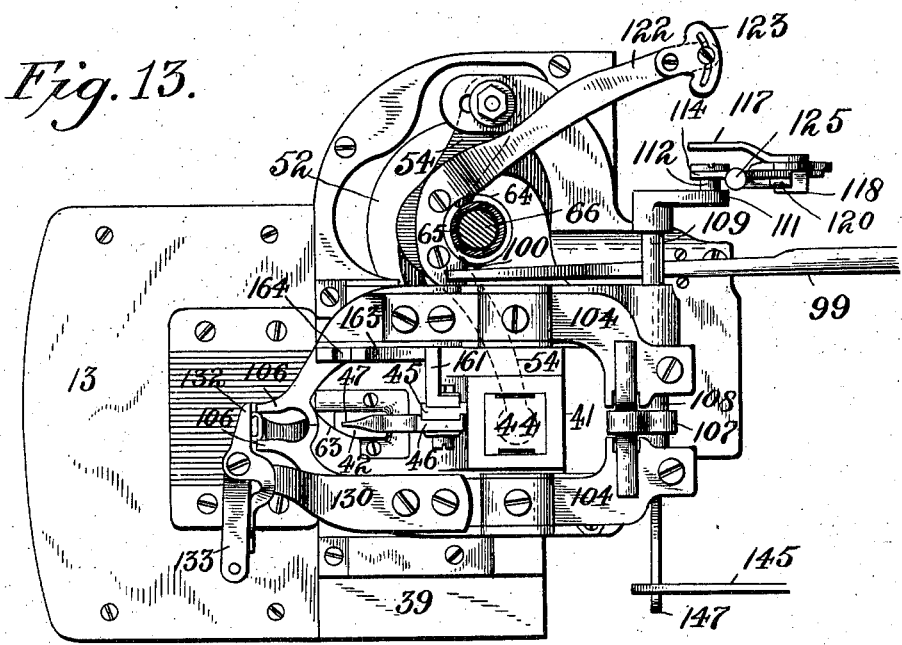
Figure 14:
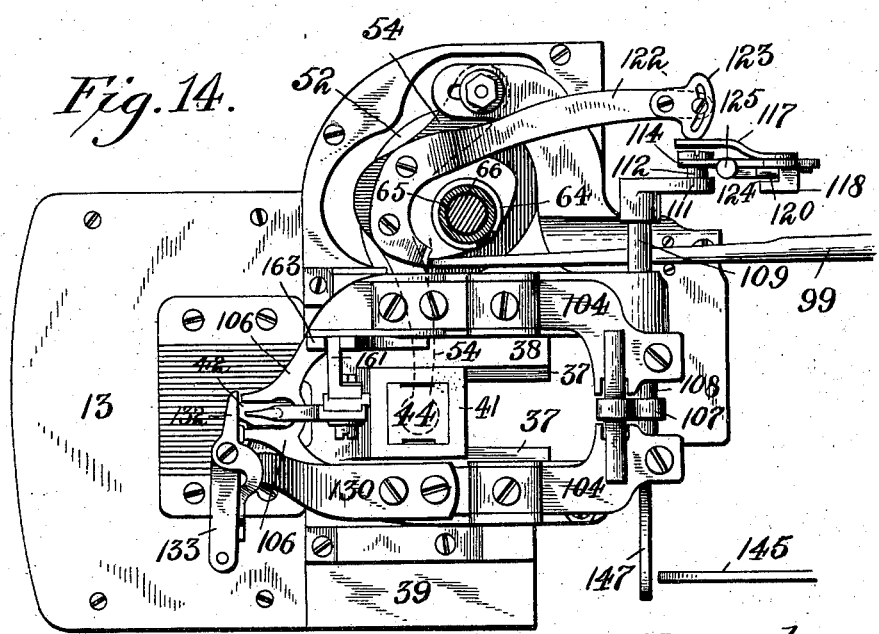

In the accompanying drawings, Figures 1 and 2 are opposite side elevations of a machine embodying the present invention. Fig. 3 is a front end view, and Fig. 4 a rear end view, of the same. Fig. 5 is a vertical longitudinal section of the same. Fig. 6 is a horizontal section through the upper part of the arm of the machine on line 6 6, Fig. 1. Fig. 7 is a plan view, partly in horizontal section, on line 7 7, Fig. 1. Fig. 8 is a horizontal section on line 8 8, Fig. 1. Figs. 9, 10, 11, and 12 are detail views to show the treadle-rod connections with the closing-arm of the work-clamp and the means for preventing a second depression of the treadle-rod after the clamp has once been closed. Figs. 13 and 14 are detail plan views of the work-clamp and buttonhole-cutting mechanism. Figs. 15 and 16 are detail side and front elevations of the buttonhole-cutting devices. Fig. 17 shows the cutter-operating cam and the actuating mechanism for the spring-winding pawl-and-ratchet device. Figs. 18 to 26, inclusive, are detail views relating to the cutter-operating cam and the mechanism for winding up its operating-spring and for tripping the cam. Figs. 27 and 28 are side and plan views, respectively, showing part of the buttonhole-cutting mechanism and the chip-receptacle. Fig. 29 is a detail view of the tension devices and tension-release. Figs. 30 and 31 are detail side and plan views of the thread-cutter. Fig. 32 is a detail view of the rear adjustable steadying device for the traveling stitching-frame.

Referring to the drawings, 12 denotes a base to be fastened to a work bench or table, and 13 denotes a work-support rising from and rigid with the base 12, these parts comprising what may be termed the "stationary" work-frame of the machine.

14 denotes what may be termed the "movable" or "traveling" stitching-frame and on which are mounted the stitch-forming and feeding mechanisms.

The base 12 is provided with a standard 15, having pivot-screws 16, on which is mounted a two-armed crane 17, on which the stitching-frame 14 is pivotally mounted by means of the center screws 18, so that the stitching-frame will be free to swing lengthwise of the buttonholes on the pivot-screws 16 and will also be free to swing sidewise of the buttonholes, as in working the eyes of the buttonholes and in barring, on the pivot or center screws 18, all as in the machine of my aforesaid application.

19 is the driving-shaft mounted in the stitching-frame and provided with twin quartering-cranks 20, connected by pitmen 21 with twin cranks 22 on the needle-bar-operating shaft 23, journaled in the upper part of the arm of said stitching-frame, so that the said shaft 23 is rotated from the driving-shaft 19 in a well-known manner. The shaft 23 is provided at its forward end with a double crank 24, connected to the needle-bars 25 and 26, carrying the eye-pointed needles 27 and 28, to which out-of-time movements are imparted, so that they will operate, as fully described in my application aforesaid, in coöperation with an upper looper 29 and a suitable lower-looper mechanism to form the double-purled overseam of my Patent No. 681,670 in the manner fully set forth in my said application, Serial No. 24,679. As this needle-bar mechanism is not herein claimed, but is embraced by my application, Serial No. 111,474, filed June 13, 1902, it need not be herein more fully described. The lower-looper mechanism herein shown is the same as that fully illustrated and described in my application aforesaid and is operated from the driving-shaft 19 as before, and the means for imparting longitudinal movements to the stitching-frame from the cam-groove 30 in the feed-wheel 11, lateral movements to said stitching-frame from the cam-groove 10 in the cam-wheel 31, and periodical rotary movements to the needles and loopers from the cam-groove 9 in the said cam-wheel 31 through the two-armed lever or rocker 32, having racks 33 and 34, engaging pinions 35 and 36, to rotate the needle-bar and looper mechanism, are also the same as before, so that these parts of the machine need not be herein more particularly described.

In the present machine the stationary work-support 13 is provided with a guideway afforded by ways 37, formed on plates 38, adjustably attached to a plate 39, properly secured to the said work-support. Having a sliding fit between the ways 37 is base-plate or foot-piece 40, from which rises a hollow standard 41. Attached to the base-plate or foot-piece 40 is a die-plate 42, in which is formed a die or throat 43. Vertically movable in the hollow standard 41 is a cutter-bar 44, having an arm 45, to which is secured the shank 46 of the buttonhole-cutter 47, which registers with the die or throat 43. The cutter-bar 44 is provided at its lower end with a roller-stud 451, which fits between flanges formed on a lever 48, fulcrumed on the screw 49 on the traveling stitching-frame and having a roller-stud 50 entering a cam-groove 51 of a cam-cylinder 52, so that when the said cam-cylinder is rotated the buttonhole-cutter 47 will be operated to cut a buttonhole. The cam-cylinder 52 is provided in its top with a cam-groove 521 entered by a roller-stud 53 on a transfer-lever 54, pivoted at 55 to a rigid part of the stitching-frame and having at its free end a rounded head 56, entering an opening 57, formed in the lower part of the vertically-movable cutter-bar 44, so that when the said cam-cylinder 52 is rotated the said lever 54 will be operated to move the cutting devices lengthwise of the buttonholes forward to cutting position and back again to the position out of the way of the needles which they occupy during the stitching operations. The cam-groove 521 has an extended eccentric or non-acting part, which will cause the lever 54 to dwell or pause after the cutting devices have been shifted forward to cutting position and before they are retracted long enough for the cutter to descend to cut a buttonhole and then again be lifted, the cam-grooves 51 and 521 being so arranged or timed relative to each other and with regard to the levers which they operate that the vertical reciprocating movements of the cutter will mainly occur between the times when the forward and backward transfer movements of the cutting devices take place, so that the cutting operation will be effected after the cutting devices have reached their forward cutting position, and the backward transfer movement of the cutting devices will not commence until after the cutter has risen from the work.

The throat 58 for the needles is formed in a curved bar 59, pivotally mounted on the looper-support 60 and yieldingly held in working position against a stop 61 on said looper-support by a spring 62. An incline 63, formed either on the foot-piece 40 of the movable cutter-frame or on the die-plate 42, (in the present instance on the latter,) is so arranged relative to the throat plate or bar 59 as to engage some part, as 59¹, of said bar when the cutting devices move forward to cutting position, and thus tilt the throat plate or bar over slightly out of the way, this feature of the tilting throat plate or bar being essentially the same as that of my United States Patent No. 677,391, dated July 2, 1901.

The cam-cylinder 52 is actuated for each transfer and cutting operation by the stored-up power of a compressed torsional spring 64, as in the machine of my former application referred to. To this end the said cam-cylinder is loosely mounted for free rotation on a sleeve 65, journaled on a rod 66, fixed to the traveling stitching-frame. Secured to the top of the sleeve 65 is a collar 67, to which one end of the spring 64 is attached, the other or lower end of said spring being connected with said cam-cylinder. To the lower end of the sleeve 65 is attached a ratchet-wheel 68, engaged by a spring-pressed pawl 69, pivoted to a pawl-carrier 70, which is in turn jointed to the upper end of a lever 71, working in a recessed front end of the stitching-frame 14 and fulcrumed on a screw 72, entering said frame. The lever 71 is provided with a yoke 73, embracing an eccentric 74 on the driving-shaft 19, so that as said shaft rotates the said lever will be vibrated to actuate the pawl-and-ratchet device just referred to, and thus wind up or compress the torsional spring 64 during the operation of stitching a buttonhole.

It is desirable that only a single rotation of the ratchet-wheel 68 should occur in winding up or compressing the torsional spring 64, and this should be effected during the formation of the least number of stitches required for the shortest buttonholes, the pawl 69 being reciprocated once at each stich or at each rotation of the driving-shaft 19. To prevent further movement of the ratchet-wheel after it has performed a complete rotation in winding up the spring 64 when buttonholes having a large number of stitches are being worked, the ratchet-wheel 68 is provided with a shield or pawl-lifter 75, which when the said ratchet-wheel has completed a rotation will disengage the pawl from the ratchet-wheel, as shown in Fig. 21, so that the said pawl will then work idly until the said shield has been moved forward far enough to enable the pawl to drop behind it. To this end the cam-cylinder 52 is provided with a pin 76, which projects below its lower face and which is so arranged that its path of movement will intersect the shield 75. When the spring 64 has been wound up, the pin 76 will be just in front of the shield 75, as denoted by the dotted-line position of the pin in Fig. 21; but when the cam-cylinder 52 performs a rotation for the cutter-transfer and cutting operation the said pin comes around and strikes the said shield from behind, as will be understood from Fig. 22, with a sufficient impulse to start the ratchet-wheel slightly forward to enable the pawl 69 to drop in behind it, as shown in said last-named figure. Anything more than a slight forward movement of the ratchet-wheel by the impulse of the pin 76 will be prevented by the spring 64, which is at this time unwound, and with which spring the said ratchet-wheel is connected through the sleeve 65.

For the purpose of holding the cam-cylinder 52 stationary while the spring 64 is being wound up the said cam-cylinder is provided in its lower face with a notch or opening 77, to be entered by a lug 78 on an arm 79 of a retaining and releasing latch-lever pivoted on a screw 80, entering a suitable part of the stitching-frame, and having a second arm 81 constructed to form a shoulder 82. The retaining-lug 78 is yieldingly pressed into the notch or opening 77 in the cam-cylinder by a spring 83. The latch-lever is provided with a third arm 84, to be engaged by a shoulder or projection 85 on a treadle-rod 86, so that when the said rod is depressed by the attendant the lug 78 will be withdrawn from its notch or recess on the said cam-cylinder, leaving the latter free to be rotated by the stored-up power of the wound-up or compressed torsional spring 64 to effect the cutter-transfer and cutting operations, as has hereinbefore been indicated.

To insure the stoppage of the cam-cylinder when it has performed a rotation, said cylinder is provided with a peripheral cam projection 87, the path of movement of which intersects the upper end of the arm 81 of the latch-lever when the latter is in such position as to enable the lug 78 to be disengaged from the notch 77 of said cam-cylinder, so that when the rotation of the said cylinder is nearing completion said cam projection will engage the said arm 81, and thus positively force the lug 78 into the notch 77 to arrest the movement of said cylinder.

It is essential that the cam-cylinder should not be released from its retaining and releasing latch-lever excepting when the spring 64 is fully wound up, as otherwise said spring would not have sufficient tension to cause a complete rotation of the cam-cylinder and the cutting devices might in their transfer movements stop in such position as to be in the way of the needles, and this would be disastrous if the machine should under such conditions be accidentally started. To avoid such danger, a guard plate or disk 88 is rigidly attached to the lower face of the ratchet-wheel 68 for coöperation with the shoulder or projection 82 on the arm 81 of the latch-lever, said shoulder and plate or disk being relatively so proportioned and arranged that the said latch-lever cannot be moved far enough to disengage the lug 78 from the cam-cylinder excepting when a notch 89, with which the said guard-disk is provided, is in register with the said shoulder 82, and which will occur only when the spring 64 is fully wound up. In other words, if the treadle-rod 86 were to be accidentally depressed except when the notch 89 is opposite the shoulder 82 on the arm 81 of the latch-lever said shoulder will come in contact with the full peripheral portion of the guard-disk, and thus prevent such full movement of the latch-lever as is necessary to entirely withdraw the lug 78 from holding engagement with the cam-cylinder 52. Backward movement of the ratchet-wheel 68 is prevented by the spring-pressed detent-pawl 90, pivoted to a suitable part of the stitching-frame.

For the purpose of cushioning the shock which would otherwise result from the sudden stoppage of the cam-cylinder 52 when the latter has completed its rotation under the stress of the torsional spring 64 the lower face of the said cam-cylinder is recessed to form a hub 91, on which is loosely fitted a ring 92, having an arm 93, which forms one wall of the stopping notch or recess 77, and which arm receives the contacting impact of the stopping-lug 78 when the rotation of the cam-cylinder is to be arrested. The ring 92 has a second arm 94, against which bears one end of a cushioning-spring 95, housed in a recess in the lower face of the said cam-cylinder, and which spring softens the shock of the impact-arm 93 against the stopping-lug 78. The periphery of the cam-cylinder is partly cut away at its lower edge to form the cam portion 96, against which the lug 78 bears under the influence of the spring 83 before the stopping-notch 77 reaches the said lug, so that the latter will be partly in the path of rotation of the impact-arm 93 before said arm strikes said lug, and thus a reliable stopping action of the cam-cylinder is provided for beyond that to be partly insured by the peripheral cam projection 87.

The driving-shaft 19 of the present machine is provided with a loose pulley 97, having a clutch connection with said shaft, as described in my United States Patent No. 673,353 and as also set forth in my aforesaid application, Serial No. 24,679, said clutch connection being governed by a clutch-controlling lever 98 as before. When a buttonhole has been cut and the cutting devices have been removed out of the way of the needles, the machine is to be started for a stitching operation, and the mechanism for effecting the stopping and starting of the present machine will now be described.

Jointed at its rear end to the clutch-controlling lever 98 is a stopping and starting rod 99, resting at its forward end when the machine is running behind a projection or lug 100, formed on or movable with the cutter-transfer lever 54. The cam-wheel 31, rotating with the feed-wheel 11, is provided with an upwardly-projecting tripping-finger 101, arranged to engage a depending lug or finger 102, attached to the rod 99, when the stitching and barring of a buttonhole have been completed, and thereby lift the said rod 99 out of its forward end engagement with the lug 100, thus permitting the spring 103 to draw the upper end of the clutch-controlling lever forward from the dotted-line position shown in Fig. 2, occupied by said lever when the machine is running, to the full-line position shown in Figs. 1, 2, and 5, assumed by said lever when the machine is at rest, to uncouple the pulley 97 from the shaft 19 to stop the machine. When the cam-cylinder 52 is next released to effect a buttonhole-cutting operation, the forward movement of the transfer-lever 54 causes the projection 100 to travel away from the rod 99, so that the forward end of said rod then falls in behind said projection 100, and when the said transfer-lever makes its backward stroke in removing the cutting devices out of the way of the needles of the machine said projection abuts against the forward end of the said rod 99, thereby forcing said rod rearward and moving the clutch-controlling lever to the dotted-line position of Fig. 2 to cause the pulley 97 to be coupled to the driving-shaft 19, and thereby start the machine running for the stitching operation.

The work-clamp comprises the arms or levers 104, pivoted on blocks 105, suitably supported from the plate 39, secured to the stationary work-support 13 of the work-frame, said arms or levers carrying the upper jaws or parts 106 of the clamp at their forward ends. The rear ends of the arms or levers 104 are connected by a link or short pitman 107 with a crank 108 on a clamp-shaft 109, journaled in ears 110 near the rear end of the clamp-frame. The clamp-shaft 109 is provided with a clamp-closing arm 111, having a pin or stud 112, entering a slot 113 of a vertically-movable slide 114, normally retained in a raised position by a spring 115, connected with a bracket 116 and with said slide. Attached to the slide 114 by a pivot-pin 171 is a latch-plate 117, having a lug 118, which is transversely movable in a notch 119, formed in the treadle-rod 86, beneath a lug or projection 120 on said rod, a spring 121 normally holding said lug 118 in locking engagement with the said lug or projection 120 of said treadle-rod, so that when said rod is depressed it will draw the said slide downward from the position shown in Figs. 9 and 10, and the engagement of the top wall of the slot 113 with the pin or stud 112 on the clamp-closing arm 111 will turn the clamp-shaft 109 to close the clamp. After the clamp has been closed the continued downward movement of the treadle-rod 86 (as the crank 108 passes over the dead-center to holding position, as in the clamp shown and described in United States Patent No. 339,640, dated April 13, 1886) causes the projection 85 on said rod to engage the arm 84 of the latch-lever, which locks and releases the cutter-operating cam-cylinder 52, as hereinbefore described, so that the downward movement of the said treadle-rod first closes the clamp and then enables the cutting operation to be effected in the manner already fully described.

As has already been stated, it is essential that the cutting mechanism should not be tripped excepting when the torsional spring 64 is fully wound up, and the guard plate or disk 88 is provided for this purpose; but additional safety devices are also provided by the present invention to guard against an ill-timed release of the cutter-operating cam, such additional safety devices locking the treadle-rod from being depressed by the attendant excepting when the clamp is open. To this end the cutter-transfer lever 54 is provided with an arm 122, having a contact projection or part 123 preferably adjustably mounted on said arm, and which contact projection as the said transfer-lever is just completing its forward transfer movement will strike against the latch-plate 117 (see Fig. 14) and move said plate inward toward the treadle-rod 86 against the stress of the spring 121, causing a notch 124 in the lug 118 to register with the holding lug or projection 120 on the treadle-rod, thereby unlocking the slide 114 from the treadle-rod, so that the spring 115 may lift said slide until a bunter-pin 125 on said slide strikes a cushioned stop-arm 126 on the bracket 116.

When the treadle-rod is released by the attendant, the spring 115, which normally lifts said rod, will cause the lugs 118 and 120 to again assume a locking engagement with each other, the lug 120 being beveled off on top to enable it to ride past the holding part of the lug 118 of the yieldingly-mounted latch-plate 117; but so long as the work-clamp is closed the treadle-rod is held from such downward movement as would cause the projection 85 on the treadle-rod 86 to strike the arm 84 of the latch-lever and thus release the cam-cylinder 54, and the devices by which such depression of the treadle-rod is at this time prevented will now be described.

Pivotally mounted on the vertically-movable slide 114 is a guard-lever 127, acted on by a spring 128 to hold the lower end of said lever when the clamp is closed forward over some relatively stationary part of the machine, which in the present instance is the slide-bar 129, which permits the stitching-frame to move laterally on the work-frame, as described in my application, Serial No. 24,679. Thus while the clamp is closed the pin or stud 112 on the clamp-closing arm 111 and engaged in the slot 113 of the slide 114 will hold said slide (which is so mounted as to be free to swing back and forth lengthwise of the machine to a limited extent) forward, so that the lower end of the guard-lever will be over its relatively stationary stop part, (bar 129,) as shown in Fig. 9; but when the clamp is open the said slide and the parts therewith connected will be moved backward by the clamp-closing arm 111 far enough to clear the lower end of the guard-lever from the vertical plane of the bar 129, as shown in dotted lines in Fig. 9, and in such positions of the parts the treadle-rod will be free to be depressed for a clamp-closing, a buttonhole-cutting, and a machine-starting operation.

It will thus be understood that the mechanism just described will prevent a second depression of the treadle-rod after the work-clamp has once been closed until after it has again been opened, while the guard plate or disk 88 will prevent the cutting devices from being actuated excepting when the torsional spring 64 is fully wound up, and that these safety or guard devices will effectually prevent such improper operation of the machine as would be liable to result in breakage of the parts or defective work.

The improved machine is preferably provided with a thread-cutting and holding device for severing both needle-threads close to the upper side of the work when a buttonhole has been completed and for holding the ends of the threads until after they have been attached to the work by the formation of a few stitches at the working of the next succeeding buttonhole. To this end a thread-cutter-supporting arm or plate 130 is attached to one of the clamp arms or levers 104. Fixed to the cutter-supporting arm or plate 130 is a spring-plate 131, having a thread-nipping part 132, and pivotally mounted on the said arm or plate 130 is a cutter-lever 133, having a thread cutting and holding finger 134, provided with a concave inner edge, the lower stationary member or cutting edge of the shear thread-cutter being formed on a finger 135 at the forward part of the plate 130. The finger 134 is arranged to swing across the vertical path of the needles or across the paths of the threads running from the work to the eyes of the needles when the stitching and barring of a buttonhole has been completed and at which time the traveling needles are at the small or bar end of the buttonhole, the concave edge of said finger tending to draw the threads toward each other, so that the severed ends of said threads may both be properly held by the thread-nipping elements of the thread-cutter. When the stitching operation for a buttonhole has been completed and the needles are both lifted, the cutter-lever 133 will be operated (in the present instance manually) to swing the cutting-finger 134 toward the cutting-finger 135 and beneath the thread-nipping part or finger 132. This operation of the lever 133 will sever both needle-threads close to the work and will clamp the ends of the threads running to the eyes of the needles between the upper surface of the finger 134 and the lower surface of the thread-nipping finger 132. At the stitching of the next succeeding buttonhole after the needles have traveled away from the finger 134 toward the eye portion of the buttonhole the lever 133 will be operated to swing the said finger back to its first position to open the shears for the next thread-cutting operation.

After the needle-threads have been severed the clamp is preferably opened by an automatically-operating clamp-opening device held by a latch which is preferably tripped from the thread-cutting lever and at the thread-cutting operation, as will now be described. Mounted to slide in a guideway afforded by ears 136, formed on the arm of the stitching-frame or in a bracket attached thereto, is a clamp-opening rod 137, having at its rear end a depending arm 138, entering a slot in an arm 139, attached to the clutch-controlling lever 98. Between a collar 140 on the rod 137 and one of the ears 136 is a coil-spring 141, which when compressed has a tendency to move the rod 137 forward. When the clutch-controlling lever moves to the dotted-line position of Fig. 2 to start the machine, the arm 139 on said lever acting on the arm 138 on the rod 137 draws the said rod rearward, compressing the spring 141, and the hooked end 142 of a spring-pressed latch-lever 143 then engages a notch 144 in the said rod 137 and holds said rod in its retracted position until said latch-lever is released. The rod 137 is provided at its forward end with a pivoted bar or lever 145, pressed upon by a spring 146, and the clamp-shaft 109 is provided with a clamp-opening arm 147, which when the clamp is closed and the rod 137 is retracted is in line with the bar or lever 145. Attached at its forward end to the thread-cutter lever 133 is a rod 148, the rear end of which slides through an opening in the upper arm of the latch-lever 143, said rod being provided with a projection or collar 149, which when the said cutter-lever is operated to sever the needle-threads will come in contact with the upper arm of said latch-lever and lift the hooked end 142 thereof out of engagement with the notch 144 of the sliding rod 137, thus leaving said rod free to be shot forward by its spring 141, so that the bar 145, carried by said rod, will forcibly engage the clamp-opening arm 147 of the clamp-shaft, thus forcing said arm forward and downward to open the clamp. As the clamp will be again closed before the rod 137 is retracted by the clutch-controlling lever 98 when the said lever is moved to its dotted-line position to start the machine, the arm 147 will engage the yieldingly-mounted bar or lever 145 and lift the same, as shown in Fig. 1; but when the upper end of the clutch-controlling lever is swung rearward in starting the machine and the rod 137 is also drawn rearward the said bar or lever 145, movable with said rod, will fall in behind the arm 147 in readiness for the next clamp-opening operation.

To automatically release the tension on the needle-threads when the machine is stopped, the vertically-movable stop-motion rod or plunger 150, carried by the stop-motion lever 98, is provided with a block or collar 151, arranged to engage a hook 152, depending from the rear arm of a tension-releasing lever 153, the forward end of which extends beneath a pin 154, attached to a vertically-movable tension-releasing plate 155, engaged by arms 156, depending from the upper disks of the tension devices 157 or from plates 158 overlying said upper disks. Thus when the parts of the clutch are in the unclutched positions, (shown more clearly in Fig. 5,) with the plunger depressed, the collar 151 on said plunger will through the hook 152 draw the rear end of the lever 153 downward to raise the plate 155 and release the tension on the needle-threads, as clearly shown in Fig. 29.

The take-up levers 159 are arranged adjacent to the tension devices and are operated by the grooved cams 160 on the needle-bar-operating shaft 23.

The connected buttonhole-cutting members, comprising the vertically-movable knife or cutter 47 and the die-plate 42, having the die or throat 43, are mounted to slide back and forth in unison on the work-frame toward and from the jaws or work-holding parts or members 106 of the work-clamp, as has already been indicated. The work-clamp is fixedly mounted on the work-frame, so that it always occupies the same position, and the devices which govern the movements of the traveling stitching-frame cause the stitch-forming devices (comprising the needles and loopers) always to assume certain predetermined positions relative to the work-holding jaws of the work-clamp. It is therefore necessary in order to insure even and uniform stitching of the buttonholes that the cutting devices in moving forward to the stitch-forming devices to cut the buttonholes in stitching position should when performing their cutting operation always be accurately centered, both laterally and longitudinally, with relation to the work-clamp and the needles. The guideway-plates 38, on which the base-plate or foot-piece 40 of the cutter-frame slides, insure a proper centering of the cutting devices laterally; but as there must be some little looseness in the parts by which the longitudinal movements of the connected cutting devices are effected and as this looseness is liable to result in cutting the buttonhole-slits in uneven lengthwise positions the present invention provides a device for centering the connected cutting members in cutting position lengthwise of the buttonholes and for locking them in such position during the cutting operations, so that at whatever speed the machine may be running or whatever may be the strength or stress of the compressed spring 64 there will be no overthrowing of the cutting devices when they are moved forward to cutting position, and the buttonhole-slits will therefore always be made in a predetermined longitudinal position relative to the work-clamp and needles. To this end the arm 45 of the vertically-movable cutter-bar 44 is provided with a rigid finger 161, projecting in the present instance from a plate 162, fixed to the said arm 45, said finger being rounded or beveled off beneath. Rigidly connected with the work-support 13 or with the plate 39, secured to said work-support, is a standard 163, having a vertical slot or guideway 164, in which the widest part of the finger 161 has a close sliding fit, said finger being just above the level of the top of the said standard 163 when the cutter-bar and cutter are in raised position. When the connected cutting devices are moved forward to cutting position, the finger 161 is brought above the vertical guideway 164, and should the cutting devices not be properly centered lengthwise of a buttonhole to cut the buttonhole-slit exactly in proper position, the descent of the rounded or beveled finger 161 into the said guideway 164 will not only properly center the cutting devices, but will lock them in such centered position during the cutting operation.

The present machine is preferably provided with a looper-thread pull-off device comprising a lever 165, having an operating-pin 166, extending into a cam-groove 167 of the looper-cam 168, and having a hook 169, working between the stationary thread-hooks 170 on the work-frame 14. (See Figs. 5, 8, and 17.)

The buttonhole-cutter herein shown and described (and more particularly adapted for leather-work) removes a small section of the material in forming the eye and slit portion for each buttonhole, and these sections of material, or "chips" or "punchings," as they may be termed, are liable to cause trouble if they get into the cams or some other of the moving parts of the machine. To avoid any difficulty from this source, the present machine is provided with a receptacle in the form of a hopper 172, located beneath the die-plate 42, through which the chips or punchings are forced by the cutter or punch 47, and the said hopper is provided with one or more outlet-spouts 173, extending down below the parts, which might be clogged by the chips or punchings, so that these are conducted away to a point or points where they fall harmlessly from the machine. The constant vibrating movements of the looping mechanism within and inclosed by the hopper 172 prevent the chips or punchings from lodging among the parts of the said looping mechanism. Owing to the fact that the hopper 172 is mounted on the movable stitching-frame, it will be so jarred or agitated in the operation of the machine that the chips or punchings will not fail to be discharged from the outlet spout or spouts.

The traveling stitching-frame 14 is steadied at its forward end by the block 175 on the pin 176, attached to the stitching-frame, said block being movable in a suitable guideway on the standard or work-support 13 of the stationary work-frame, and the said pin having an eccentric part 177, which may be turned to secure a proper adjustment, all as more fully shown and described in my aforesaid application, Serial No. 24,679. In addition to the adjustable steadying device for the forward end of the traveling stitching-frame the present machine is provided with an adjustable steadying device for the rear end of the stitching-frame, this rear-end steadying device comprising a steel wear-plate 178, secured to the base 12 of the stationary work-frame, and a screw 179, tapped in the rear part of the stitching-frame and preferably having an extended flat head or plate 180 in contact with said wear-plate 178. The screw 179 may be turned to secure the proper adjustment of the head 180 relative to the said wear-plate and is fixed in any desired position of adjustment by the lock-nut 181. This adjustable steadying device for the rear end of the traveling stitching-frame is advantageous in that it is adjacent to that part of the traveling frame to which the power is applied by the belt running on the driving-pulley 97, so as to afford a proper resistance to the pull of the said belt, and thereby insure smooth and steady movements of the traveling stitching-frame.

The general operation of the present machine has already been described in the early part of this specification, and the operations of the different parts of the machine have been set forth in connection with the descriptions of their constructions, so that no further description of the operation of the improved machine will here be necessary.

The present invention is not to be understood as being limited to the details of construction herein shown and described, for many features of the present invention may be applicable to automatic buttonhole cutting and stitching machines of different characters from the machine herein illustrated, as to machines for making straight buttonholes, or to machines in which the work instead of the stitch-forming mechanism will be caused to travel to space the stitches along the buttonholes, or to machines having different forms of buttonhole or overseaming stitch-forming mechanisms than that embodied in the present machine.

Having thus described my invention, I claim and desire to secure by Letters Patent—

1. In a buttonhole cutting and stitching machine, the combination with a work-frame and a work-clamp mounted thereon, of a stitching-frame, stitch-forming devices mounted on said stitching-frame, one of said frames being movable relative to the other, feeding mechanism for causing one of said frames to travel to space the stitches along the buttonholes, and a buttonhole-cutting device mounted on said work-frame and comprising upper and lower cutting members mounted on a common frame or part and rigidly connected horizontally so as to be bodily movable together on said work-frame lengthwise of the buttonholes toward and from the jaws or work-holding members of said work-clamp.

2. In a buttonhole cutting and stitching machine, the combination with a work-frame and a work-clamp mounted thereon, of a stitching-frame, stitch-forming devices mounted on said stitching-frame, one of said frames being movable relative to the other, feeding mechanism for causing one of said frames to travel to space the stitches along the buttonholes, a buttonhole-cutting device mounted on said work-frame, and comprising upper and lower cutting members movable together on said work-frame toward and from the jaws or work-holding members of said work-clamp, and a locking device for centering the buttonhole-cutting members endwise and comprising a vertical guideway mounted on the work-frame and a part, vertically movable with the buttonhole-cutter, to enter said guideway as the cutter descends to cause the connected cutting members to register with a predetermined position and to lock them in such position against longitudinal horizontal displacement during the cutting operation.

3. In a buttonhole cutting and stitching machine, the combination with a work-frame and a work-clamp mounted thereon, of a stitching-frame and stitch-forming devices mounted for periodical rotary movements on said stitching-frame, one of said frames being movable relative to the other, means for turning the stitch-forming devices at intervals to stitch the eyes of the buttonholes, feeding mechanism for causing one of said frames to travel, to space the stitches along the buttonholes, and a buttonhole-cutting device mounted on said work-frame and comprising upper and lower cutting members mounted on a common frame or part and rigidly connected horizontally so as to be bodily movable together on said work-frame lengthwise of the buttonholes toward and from the jaws or work-holding members of said work-clamp.

4. In a buttonhole cutting and stitching machine, the combination with a work-frame and a work-clamp mounted thereon, of a stitching-frame, stitch-forming devices mounted for periodical rotary movements on said stitching-frame, one of said frames being movable relative to the other, means for turning the stitch-forming devices at intervals to stitch the eyes of the buttonholes, feeding mechanism for causing one of said frames to travel to space the stitches along the buttonholes, a buttonhole-cutting device mounted on said work-frame and comprising upper and lower cutting members movable together on said work-frame toward and from the jaws or work-holding members of said work-clamp, and a locking device for centering the buttonhole-cutting members endwise and comprising a vertical guideway mounted on the work-frame and a part, vertically movable with the buttonhole-cutter, to cause the connected cutting members to register with a predetermined position and to lock them in such position against longitudinal horizontal displacement during the cutting operation.

5. In a buttonhole cutting and stitching machine, the combination with a stationary work-frame and a work-clamp mounted thereon, of a movable stitching-frame, stitch-forming devices carried by said stitching-frame, feeding mechanism for causing the stitching-frame to travel to space the stitches along the buttonholes, and a buttonhole-cutting device mounted on said work-frame and comprising upper and lower members rigidly connected horizontally so as to be bodily movable in unison on said work-frame lengthwise of the buttonholes toward and from the jaws or work-holding parts of said work-clamp.

6. In a buttonhole cutting and stitching machine, the combination with a stationary work-frame and a work-clamp mounted thereon, of a movable stitching-frame, stitch-forming devices carried by said stitching-frame, feeding mechanism for causing the stitching-frame to travel to space the stitches along the buttonholes, a buttonhole-cutting device mounted on said work-frame and comprising connected upper and lower members movable in unison on said work-frame toward and from the jaws or work-holding parts of the said work-clamp, and means for centering the movable buttonhole-cutting device in its forward or cutting position to cause the buttonhole-slits to be uniformly made in a predetermined position relative to the work-clamp and stitch-forming devices.

7. In a buttonhole cutting and stitching machine, the combination with a stationary work-frame and a work-clamp mounted thereon, of a movable stitching-frame, stitch-forming devices carried by said stitching-frame and mounted for periodical movements thereon, means for imparting turning movements to the said stitch-forming devices, at intervals, to stitch the eyes of the buttonholes, feeding mechanism for causing the stitching-frame to travel to space the stitches along the buttonholes, and a buttonhole-cutting device mounted on said work-frame and comprising upper and lower members mounted on a common frame or part and rigidly connected horizontally so as to be bodily movable in unison on said work-frame lengthwise of the buttonholes toward and from the jaws or work-holding parts of the said work-clamp.

8. In a buttonhole cutting and stitching machine, the combination with a stationary work-frame and a work-clamp mounted thereon, of a movable stitching-frame, stitch-forming devices carried by said stitching-frame and mounted for periodical movements thereon, means for imparting turning movements to the said stitch-forming devices, at intervals, to stitch the eyes of the buttonholes, feeding mechanism for causing the stitching-frame to travel to space the stitches along the buttonholes, a buttonhole-cutting device mounted on said work-frame and comprising connected upper and lower members movable in unison on said work-frame toward and from the jaws or work-holding parts of the said work-clamp, and means for centering the movable buttonhole-cutting device in its forward or cutting position to cause the buttonhole-slits to be uniformly made in a predetermined position relative to the work-clamp and stitch-forming devices.

9. In a buttonhole cutting and stitching machine, the combination with stitch-forming and feeding mechanisms, the latter comprising a rotating feed-wheel or feed-cam, of a buttonhole-cutting mechanism, a cam, rotating independently of said feed-wheel or feed-cam, for operating said cutting mechanism, a spring for actuating the said cutter-operating cam, and means, independent of the feed-wheel, and operated from the shaft which actuates the stitch-forming devices, for winding up or compressing said spring during a buttonhole-stitching operation.

10. In a buttonhole cutting and stitching machine, the combination with stitch-forming and feeding mechanisms, the latter comprising a rotating feed-wheel or feed-cam, of a buttonhole-cutting mechanism, a cam, rotating independently of said feed-wheel or feed-cam, for operating said cutting mechanism, a spring for actuating the said cutter-operating cam, means, operated from the shaft which actuates the stitch-forming devices, for winding up or compressing said spring during a buttonhole-stitching operation, and automatic means for arresting the winding-up operation, when said spring is placed under a desired tension, while the stitching operation continues.

11. In a buttonhole cutting and stitching machine, the combination with stitch-forming and feeding mechanisms, of a buttonhole-cutting device, a cam for operating said cutting device, a spring for actuating said cam, means for winding up or compressing said spring during the stitching of a buttonhole, means for holding said cam from rotation while said spring is being wound up, means for releasing said cam when the cutting device is to be operated to cut a buttonhole, and a guard or safety device to prevent said cam from being released until said spring has been placed under a desired predetermined tension.

12. In a buttonhole cutting and stitching machine, the combination with stitch-forming and feeding mechanisms, and a work-clamp, of means for closing and opening said clamp, a buttonhole-cutting mechanism, and means for preventing a second operation of the buttonhole-cutter after the said clamp has been closed until after it has next been opened.

13. In a buttonhole-stitching machine, the combination with stitch-forming and feeding mechanisms and a work-clamp, of a cutter for severing the needle thread or threads when a buttonhole has been completed, and an automatic clamp-opener connected with the thread-cutter so as to be released to open the clamp by a thread-severing operation.

14. In a buttonhole-stitching machine, the combination with stitch-forming and feeding mechanisms and a work-clamp, of a cutter for severing the needle thread or threads when a buttonhole has been completed, a clamp-opening device, a spring for actuating the same to open the clamp, automatic means for putting said spring under tension, a retaining device for restraining a movement of said clamp-opening device under the stress of said spring, and means, actuated from the thread-cutter, for tripping the said retaining device to enable the clamp to be automatically opened.

15. In a buttonhole cutting and stitching machine, the combination with stitch-forming and feeding mechanisms and a work-clamp, of a buttonhole-cutting device, a cam for actuating said cutting device, a spring for operating said cam, a ratchet-wheel for putting said spring under tension, a pawl and actuating devices for winding up or compressin said spring, a pawl lifter or shield for disengaging said pawl from said ratchet-wheel when said spring has been given a desired tension, and a pin or device, rotating with said cam, for moving said pawl-lifter away from said pawl to enable the latter to resume operative engagement with said ratchet-wheel.

16. In a buttonhole cutting and stitching machine, the combination with a stationary work-frame and a movable stitching-frame, of stitch-forming devices, a feeding mechanism, a work-clamp, a buttonhole-cutting device comprising two connected upper and lower members movable together on said work-frame toward and from said stitch-forming devices, and a cam, independent of said feeding mechanism but operated from the stitch-forming driving mechanism, for moving the cutting device into and out of cutting position and for operating the cutter.

17. In a buttonhole cutting and stitching mechanism, the combination with a work-frame and a stitching-frame, one of which is movable relative to the other, of stitch-forming devices on said stitching-frame, a work-clamp on said work-frame, feeding mechanism for spacing the stitches about the buttonholes and comprising a rotating feed-cam wheel, a buttonhole-cutting device, a cam for operating said cutting device, a torsional spring for operating said cam, and means, independent of said feed-cam wheel, for winding up or compressing said spring.

18. In a buttonhole cutting and stitching machine, the combination with stitch-forming and feeding devices and a work-clamp, of a buttonhole-cutting device, a cam for operating said cutting device, a torsional spring for operating said cam, a pawl-and-ratchet mechanism for winding up or compressing said spring, a pawl guard or lifter for disengaging the pawl from the ratchet-wheel when the said ratchet-wheel has been rotated so as to place said spring under a desired tension, means for holding the said cam from rotation while the spring is being wound up, automatic means for releasing said cam when the cutter is to be operated, and a device, as pin 76, movable with said cam and serving to start the said guard or pawl-lifter forward when the said cam is rotated by the spring, to permit the pawl again to engage said ratchet-wheel for another spring-winding operation.

19. In a buttonhole cutting and stitching machine, the combination with stitch-forming and feeding mechanism, of a work-clamp comprising a shaft provided with a crank for opening and closing the jaws of the clamp and which shaft is provided with a clamp-closing arm, as 111, provided with a pin or stud, as 112, a treadle-operated bar or rod for closing the clamp, a vertically and horizontally movable slide, as 114, provided with a slot entered by said pin or stud, a latch-plate, as 117, pivotally mounted on said slide, a guard-lever 127 also mounted on said slide and arranged to engage a stationary part of the machine; whereby after the said treadle-rod has been depressed to close the clamp a second depression of said treadle-rod will be prevented until after the clamp has again been opened so that the said arm 111 can swing the said slide 114 into such position that the guard-lever will be clear of engagement with the said stationary part when said slide is moved down by the treadle.

20. In a buttonhole cutting and stitching machine, the combination with stitch-forming and feeding mechanisms, a work-clamp and a buttonhole-cutting mechanism, of a treadle-operated tripping mechanism for closing the work-clamp and for releasing the said cutting mechanism, and means for preventing a second operation of the said tripping mechanism by the treadle after the clamp has once been closed until it has again been opened.

21. In a buttonhole cutting and stitching machine, the combination with stitch-forming and feeding mechanisms, a work-clamp and a buttonhole-cutting mechanism, of a treadle-operated tripping mechanism for closing the work-clamp and for releasing the said cutting mechanism, means for preventing a second operation of the said tripping mechanism by the treadle after the clamp has once been closed until it has again been opened, and means, independent of the said treadle mechanism, for opening the clamp.

22. In a buttonhole cutting and stitching machine, the combination with stitch-forming and feeding mechanisms, a work-clamp and a buttonhole-cutting mechanism, of a treadle-operated tripping mechanism for closing the work-clamp and for releasing the said cutting mechanism, means for preventing a second operation of the said tripping mechanism by the treadle after the clamp has once been closed until it has again been opened, a cam for operating the buttonhole-cutter, a spring for operating said cam, and means for winding up or compressing said spring during a buttonhole-stitching operation.

23. In a buttonhole cutting and stitching machine, the combination with stitch-forming and feeding mechanisms, of a work-clamp comprising a shaft having a clamp-opening arm, as 147, a clamp-opening device, as rod 137, automatic means for moving the said clamp-opening device rearward when the machine is started, a spring to move the said device forward to open the clamp, a latch for restraining the forward movement of said device under the stress of said spring, and manual means for releasing said latch when the clamp is to be opened.

24. In a buttonhole cutting and stitching machine, the combination with stitch-forming and feeding mechanisms, of a work-clamp comprising a shaft having a clamp-opening arm, as 147, a clamp-opening device, as rod 137, a start-and-stop-motion device comprising a clutch-controlling lever, as 98, serving to move the said clamp-opening device rearward when the machine is started, a spring to move the said device forward to open the clamp, a latch for restraining the forward movement of said device under the stress of said spring, and manual means for releasing said latch when the clamp is to be opened.

25. In a buttonhole cutting and stitching machine, the combination with stitch-forming and feeding mechanisms, of a work-clamp comprising a shaft having a clamp-opening arm, as 147, a clamp-opening rod, as 137, automatic means for moving the said clamp-opening rod rearward when the machine is started, a spring to move the said rod forward to open the clamp, a latch for restraining the forward movement of said rod under the stress of said spring, and a thread-cutting device comprising a lever carrying a thread-cutting blade, and connections between the thread-cutting lever and the said latch; whereby, when the said thread-cutting lever is operated, the said latch will be released to permit the clamp-opening rod to open the clamp.

26. In a buttonhole cutting and stitching machine, the combination with stitch-forming and feeding mechanisms, of a work-clamp comprising a shaft having a clamp-opening arm, as 147, a clamp-opening rod, as 137, a start-and-stop-motion device comprising a clutch-controlling lever, as 98, serving to move said clamp-opening rod rearward when the machine is started, a spring to move the said rod forward to open the clamp, a latch for restraining the forward movement of said rod under the stress of said spring, a thread-cutting device mounted on said work-clamp and comprising a lever carrying a thread-cutting blade, and connections between the thread-cutting lever and the said latch; whereby, when the said thread-cutting lever is operated, the said latch will be released to permit the clamp-opening rod to open the clamp.

27. In a buttonhole-stitching machine, the combination with stitch-forming and feeding mechanisms and a work-clamp, of a cutter for severing the stitching thread or threads, and a clamp-opener operable independently of the thread-cutter but connected therewith so as to be released to open the clamp by a thread-severing operation.

28. In a buttonhole cutting and stitching machine, the combination with stitch-forming and feeding devices and a work-clamp, of a buttonhole-cutting device, a cam for operating said cutting device, a torsional spring for operating said cam, means for winding up or compressing said spring during a stitching operation, means for arresting the operation of the winding-up mechanism when the said spring has been placed under a desired tension, means for restraining the said cam from rotation while the spring is being wound up, automatic means for releasing said cam when the cutter is to be operated, and means, operated by said cam, for restoring the spring-winding-up mechanism to a condition for normal operation, so that said winding-up mechanism will again be set in motion at the next buttonhole-stitching operation.

29. In a buttonhole cutting and stitching machine, the combination with stitch-forming and feeding mechanisms, of a buttonhole-cutting device comprising upper and lower cutting or punching members, and a hopper beneath the lower or die-plate member of the cutting device, to receive the chips or punchings; said hopper having one or more outlet-spouts to conduct said chips or punchings away from the lower mechanism of the machine.

30. In a buttonhole cutting and stitching machine, the combination with a traveling stitching-frame and a stationary work-frame, of stitch-forming devices carried by said stitching-frame, work-holding devices mounted on said work-frame, a buttonhole-cutting device comprising upper and lower cutting or punching members, and a hopper mounted on said traveling stitching-frame beneath the lower or die-plate member of the cutting device and having one or more outlet-spouts to conduct the chips or punchings away from the lower mechanism of the machine.

31. In a buttonhole cutting and stitching machine, the combination with a stationary work-frame and a work-clamp mounted thereon, of a movable stitching-frame, stitch-forming devices mounted on said stitching-frame, feeding mechanism for causing the said stitching-frame to travel to space the stitches about the buttonholes, a buttonhole-cutting device comprising upper and lower rigidly-connected members mounted on a common base or frame which is movably mounted on said work-frame toward and from said work-clamp, a lever fulcrumed to said stitching-frame and serving to operate the buttonhole-cutter to cut the buttonholes, and a cam for operating said lever.

32. In a buttonhole cutting and stitching machine, the combination with a stationary work-frame and a work-clamp mounted thereon, of a movable stitching-frame, stitch-forming devices mounted for periodical rotary movements on said stitching-frame, feeding mechanism for causing the said stitching-frame to travel to space the stitches about the buttonholes, a buttonhole-cutting device comprising upper and lower rigidly-connected members mounted on a common base or frame which is movably mounted on said work-frame toward and from said work-clamp, a lever fulcrumed to said stitching-frame and serving to operate the buttonhole-cutter to cut the buttonholes, and a cam for operating said lever.

33. In a buttonhole cutting and stitching machine, the combination with a stationary work-frame and a work-clamp mounted thereon, of a movable stitching-frame, stitch-forming devices mounted on said stitching-frame, feeding mechanism for causing the said stitching-frame to travel to space the stitches about the buttonholes, a buttonhole-cutting device movably mounted on said work-frame, and comprising upper and lower cutting members movable in unison on said work-frame lengthwise of the buttonholes toward and from the stitch-forming devices, a lever fulcrumed on said stitching-frame and serving to operate the buttonhole-cutter to cut the buttonholes, means for operating said lever, and means for moving the cutting members toward and from said stitch-forming devices before and after the cutting operation.

34. In a buttonhole cutting and stitching machine, the combination with a stationary work-frame and a work-clamp mounted thereon, of a movable stitching-frame, stitch-forming devices mounted on said stitching-frame, feeding mechanism for causing the said stitching-frame to travel to space the stitches about the buttonholes, a buttonhole-cutting device comprising upper and lower cutting members movable in unison on said work-frame lengthwise of the buttonholes toward and from the stitch-forming devices, a lever fulcrumed on said stitching-frame and serving to operate the buttonhole-cutter to cut the buttonholes, means for operating said lever, means for moving the cutting members toward and from said stitch-forming devices, and a centering and locking device on the said work-frame to cause the buttonholes to be accurately cut in a predetermined position.

35. In a buttonhole cutting and stitching machine, the combination with a work-frame and a stitching-frame, one of which is movable relative to the other, of feeding mechanism for causing the movable frame to travel to space the stitches about the buttonholes, stitch-forming mechanism on said stitching-frame, a work-clamp on said work-frame, a buttonhole-cutting device comprising upper and lower members rigidly connected so as to be horizontally movable together bodily on one of said frames toward and from said work-clamp, means for operating the cutter, and means for moving the cutting device horizontally on its frame.

36. In a buttonhole cutting and stitching machine, the combination with a stationary work-frame and a work-clamp mounted thereon, of a movable stitching-frame, stitch-forming devices carried by said stitching-frame, feeding mechanism for causing said stitching-frame to travel to space the stitches about the buttonholes, a buttonhole-cutting device comprising upper and lower members rigidly connected so as to be horizontally movable together bodily on said work-frame toward and from said work-clamp, means for operating the cutter and means for moving the cutting device on said work-frame toward and from said work-clamp.

37. In a buttonhole-stitching machine, the combination with a stationary work-frame and a traveling stitching-frame, of an adjustable steadying device for the rear end of said stitching-frame and adjacent to the driving-pulley thereon.

38. In a buttonhole-stitching machine, the combination with a stationary work-frame and a traveling stitching-frame, of an adjustable steadying device for the rear end of said stitching-frame and adjacent to the driving-pulley thereon, said steadying device comprising a wear-plate on the stationary work-frame and a screw-adjustable flat head or contact plate on said stitching-frame and bearing against said wear-plate.

In testimony whereof I affix my signature in presence of two witnesses.

EDWARD B. ALLEN.

Witnesses:
HENRY J. MILLER,
HENRY A. KORNEMANN.